(12) United States Patent
Benko et al.

(10) Patent No.: US 10,175,487 B2
(45) Date of Patent: Jan. 8, 2019

(54) PERIPHERAL DISPLAY FOR HEAD MOUNTED DISPLAY DEVICE

(71) Applicant: Microsoft Technology Licensing, LLC, Redmond, WA (US)

(72) Inventors: Hrvoje Benko, Seattle, WA (US); Bo Robert Xiao, Pittsburgh, PA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 175 days.

(21) Appl. No.: 15/084,039

(22) Filed: Mar. 29, 2016

(65) Prior Publication Data

US 2017/0285344 A1    Oct. 5, 2017

(51) Int. Cl.
*G02B 27/01* (2006.01)
*G06T 19/00* (2011.01)

(52) U.S. Cl.
CPC ........ *G02B 27/0172* (2013.01); *G06T 19/006* (2013.01); *G02B 2027/0123* (2013.01); *G02B 2027/0147* (2013.01); *G02B 2027/0178* (2013.01); *G02B 2027/0187* (2013.01)

(58) Field of Classification Search
None
See application file for complete search history.

(56) References Cited

U.S. PATENT DOCUMENTS

| | | | |
|---|---|---|---|
| 6,211,913 B1 * | 4/2001 | Hansen | H04N 5/23248 348/218.1 |
| 2002/0099257 A1 | 7/2002 | Parker et al. | |
| 2004/0227703 A1 * | 11/2004 | Lamvik | G02B 27/0172 345/76 |
| 2012/0274653 A1 | 11/2012 | Tang et al. | |
| 2014/0146394 A1 | 5/2014 | Tout et al. | |
| 2014/0362113 A1 * | 12/2014 | Benson | G02B 27/0172 345/633 |

(Continued)

OTHER PUBLICATIONS

"International Search Report and Written Opinion for PCT Patent Application No. PCT/US2017/023696", dated Jun. 30, 2017, 15 pages.

*Primary Examiner* — Joseph Haley
*Assistant Examiner* — Emily Frank
(74) *Attorney, Agent, or Firm* — Medley, Behrens & Lewis, LLC

(57) ABSTRACT

Various technologies described herein pertain to a head mounted display device having a display with a central portion and a periphery portion. Graphical content can be displayed on the central portion of the display. The central portion can be a primary display that provides a field of view and displays the graphical content, and the periphery portion can be a peripheral display. The peripheral display can be positioned relative to the primary display such that an overall field of view provided by the primary display and the peripheral display is extended compared to the field of view of the primary display. Further, complementary content can be rendered based on the graphical content and caused to be displayed on the periphery portion (e.g., the peripheral display). The complementary content can include a countervection visualization viewable in a far periphery region of a field of view of human vision.

20 Claims, 12 Drawing Sheets

(56) References Cited

U.S. PATENT DOCUMENTS

| | | | | |
|---|---|---|---|---|
| 2015/0348322 A1* | 12/2015 | Ligameri | ............ | G02B 27/017 |
| | | | | 345/633 |
| 2016/0147296 A1* | 5/2016 | Yun | ...................... | G02B 27/017 |
| | | | | 345/156 |
| 2016/0377864 A1* | 12/2016 | Moran | ............... | G02B 27/0172 |
| | | | | 345/8 |
| 2017/0115489 A1* | 4/2017 | Hu | ..................... | G02B 27/0172 |

* cited by examiner

PERIPHERAL DISPLAY FOR HEAD MOUNTED DISPLAY DEVICE

BACKGROUND

Popularity of head mounted display devices has been increasing due to a resurgence in interest, driven by technological improvements such as enhanced displays, processing power, and mobility. Head mounted display devices can enable immersing a person in a virtual environment or digitally augmenting a person's vision. Two types of head mounted display devices include virtual reality devices and augmented reality devices. Moreover, head mounted display devices can enable diverse applications in areas including gaming, information visualization, medical assistance, and other types of immersive communication.

Fields of view (FOVs) of conventional head mounted display devices commonly tend to be limited. The human visual system often has a binocular field of view exceeding 180° horizontal, while traditional head mounted display devices commonly provide limited fields of view that are less than the field of view of the human visual system. For instance, some conventional virtual reality devices can have a field of view of approximately 90° horizontal, while a field of view of some conventional augmented reality devices may be even narrower (e.g., a field of view around 40° horizontal). By having narrower fields of view relative to the field of view of the human visual system, conventional head mounted display devices oftentimes result in users of such devices either seeing pitch black (e.g., for virtual reality devices) or an absence of virtual content (e.g., for augmented reality devices) in their peripheral vision. The restricted fields of view of traditional head mounted display devices can also limit an immersive potential of mixed reality systems, reduce situational awareness of a user of such conventional head mounted display devices, and leave vast information processing capabilities of the human visual system underutilized.

SUMMARY

Described herein are various technologies that pertain to head mounted display devices. According to various embodiments, a head mounted display device can include a primary display and a peripheral display. The primary display provides a field of view and displays graphical content. The peripheral display is positioned relative to the primary display such that an overall field of view provided by the primary display and the peripheral display is extended compared to the field of view of the primary display. Moreover, the head mounted display device can render complementary content based on the graphical content displayed on the primary display. Further, the head mounted display device can cause the complementary content to be displayed on the peripheral display.

According to various embodiments, a peripheral display system can be utilized in conjunction with a head mounted display device. For instance, the head mounted display device can be retrofitted to include the peripheral display system. The peripheral display system can include a peripheral display, which is attachable to the head mounted display device. When attached the head mounted display device, the peripheral display can be positioned relative to a primary display of the head mounted display device such that an overall field of view provided by the primary display and the peripheral display is extended compared to a field of view of the primary display. The peripheral display system can further render complementary content based on graphical content displayed on the primary display. Moreover, the peripheral display system can cause the complementary content to be displayed on the peripheral display.

According to yet another embodiment, a head mounted display device can output a peripheral countervection visualization to reduce effects of simulator sickness by presenting motion simulation on a retina that counters virtual motion not generated by movement of a user of the head mounted display device. The head mounted display device can receive motion information that specifies actual motion of the user of the head mounted display device. Further, a mismatch between the actual motion of the user specified by the motion information and virtual motion included in graphical content displayed on a central portion of a display (e.g., a primary display) of the head mounted display device can be detected. Responsive to detecting the mismatch, an optical flow that moves in a direction of the virtual motion included in the graphical content can be created. Further, the optical flow can be caused to be displayed on a periphery portion of the display (e.g., a peripheral display) of the head mounted display device.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
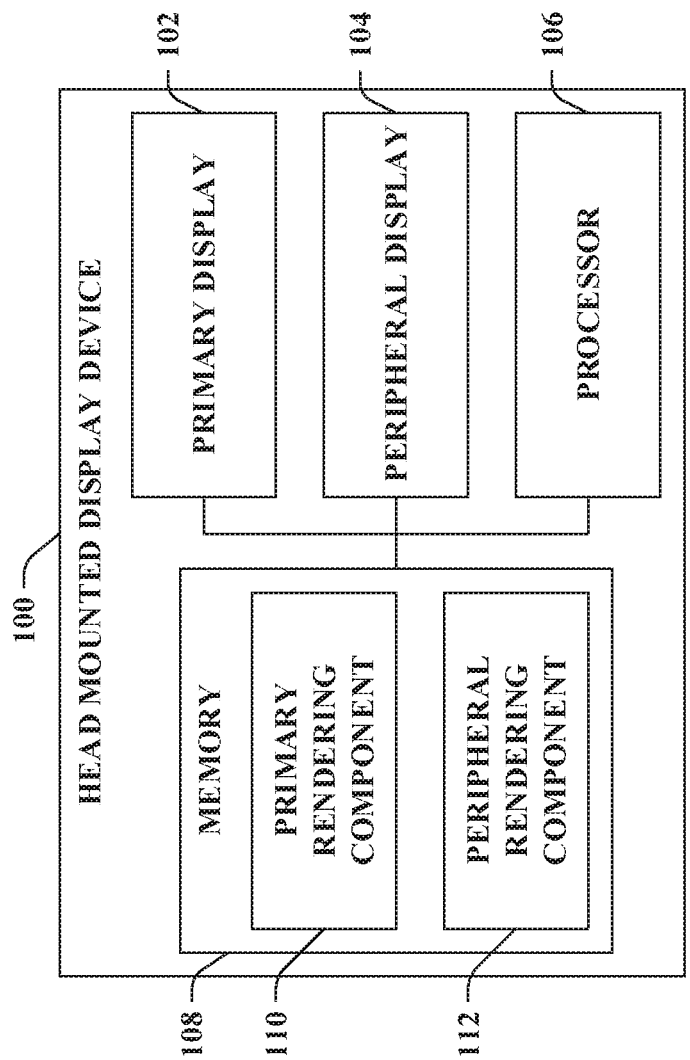
FIG. 1 illustrates a functional block diagram of an exemplary head mounted display device.

Various technologies pertaining to a peripheral display for a head mounted display device and/or a countervection visualization for display in a peripheral region (e.g., a peripheral display, viewable in a far periphery region of a field of view of human vision of a user, etc.) of a head mounted display device are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates an exemplary head mounted display device 100. According to various examples, the head mounted display device 100 can be an augmented reality device. According to other examples, the head mounted display device 100 can be a virtual reality device.

The head mounted display device 100 includes a primary display 102 and a peripheral display 104. The primary display 102 provides a field of view. The primary display 102 can display graphical content. The graphical content, for instance, can include a three-dimensional virtual scene. Further, the peripheral display 104 is positioned relative to the primary display 102 such that an overall field of view provided by the primary display 102 and the peripheral display 104 is extended compared to the field of view of the primary display 102. According to various examples, the peripheral display 104 can expand the overall field of view up to 190° horizontal, which can nearly fill a human field of view; however, it is to be appreciated that the claimed subject matter is not limited to such expanded field of view, as other fields of view provided by the combination of the primary display 102 and the peripheral display 104 are intended to fall within the scope of the hereto appended claims.

The head mounted display device 100 includes at least one processor 106 and memory 108. The processor 106 is configured to execute instructions loaded into the memory 108 (e.g., one or more systems loaded into the memory 108 are executable by the processor 106, one or more components loaded into the memory 108 are executable by the processor 106). As described in greater detail herein, the memory 108 includes instructions for rendering complimentary content which can be displayed on the peripheral display 104.

According to the example depicted in FIG. 1, the memory 108 of the head mounted display device 100 includes a primary rendering component 110 and a peripheral rendering component 112. The primary rendering component 110 can be configured to render the graphical content for display on the primary display 102. The primary rendering component 110 can further cause the graphical content be displayed on the primary display 102. Substantially any type of graphical content can be generated and displayed by the primary rendering component 110 (e.g., the primary rendering component 110 can render and cause graphical content to be displayed on the primary display 102 as part of substantially any type of application). Moreover, the peripheral rendering component 112 can be configured to render complementary content based on the graphical content displayed on the primary display 102; thus, the peripheral rendering component 112 can render the complementary content based on the graphical content generated by the primary rendering component 110. For instance, the complementary content rendered by the peripheral rendering component 112 can be based on virtual motion included in the graphical content displayed on the primary display 102. The peripheral rendering component 112 can further be configured to cause the complementary content to be displayed on the peripheral display 104.

The complementary content generated by the peripheral rendering component 112 can convey peripheral information and enhance situational awareness, while reducing motion sickness in nausea-susceptible users of the head mounted display device 100. The peripheral display 104 can fill the periphery of the head mounted display device 100. Moreover, rendering of the complementary content by the peripheral rendering component 112 can be coupled to rendering of the graphical content by the primary rendering component 110 presented on the primary display 102. It is further contemplated that the complementary content can include peripheral notifications that can be unobtrusively displayed, for example.

While FIG. 1 illustrates the memory 108 including the primary rendering component 110 and the peripheral rendering component 112, which can both be executable by the processor 106, it is contemplated that differing memories can include the primary rendering component 110 and the peripheral rendering component 112. Additionally or alternatively, differing processors can execute the primary rendering component 110 and the peripheral rendering component 112. By way of example, a first memory can include the primary rendering component 110 and a second memory can include the peripheral rendering component 112. Additionally or alternatively, the primary rendering component 110 can be executable by a first processor and the peripheral rendering component 112 can be executable by a second processor. Pursuant to an illustration, the memory that includes the primary rendering component 110 and/or the processor that executes the primary rendering component 110 can be part of a mobile device that is mechanically coupled to the head mounted display device 100 (e.g., the mobile device can be mounted on a headset of the head mounted display device 100). By way of yet another illustration, the memory that includes the peripheral rendering component 112 and/or the processor that executes the peripheral rendering component 112 can be part of a peripheral display system (e.g., a kit that includes the peripheral display 104, memory, and a processor), where the head mounted display device 100 can be retrofitted to include the peripheral display system. Following this illustration, an existing headset of the head mounted display device 100 can be retrofitted with the peripheral display system including the peripheral display 104, which can enhance the existing headset.

According to an example, the peripheral display 104 can include a light emitting diode (LED) array. The peripheral display 104 can include a high-contrast array of diffused color LEDs. Following this example, the peripheral display 104 can augment the field of view of the primary display 102 with the LEDs surrounding the primary display 102. For instance, the LEDs of the peripheral display 104 can be lightweight, low-resolution, and can surround a central display (e.g., the primary display 102) having a higher resolution. Thus, pursuant to various examples, a resolution of the primary display 102 can be higher than a resolution of the peripheral display 104; however, according to other examples, resolutions of the primary display 102 and the peripheral display 104 can be substantially similar or the resolution of the primary display 102 can be lower than the resolution of the peripheral display 104.

While many of the examples set forth herein pertain to the peripheral display 104 including LEDs, it is contemplated that the peripheral display 104 can include other types of light sources in addition to or instead of LEDs. Examples of such other types of light sources that can be included in the peripheral display 104 include light pipes, waveguides, fiber optic sources, or the like.

Moreover, a refresh rate (e.g., a frame rate) of the primary display 102 can be lower than a refresh rate (e.g., a frame rate) of the peripheral display 104. Thus, the peripheral display 104 can be driven faster than the primary display 102, which can enable the complementary content displayed on the peripheral display 104 to be smoother as compared to the graphical content displayed on the primary display 102. The refresh rate of the peripheral display 104 can be higher than the refresh rate of the primary display 102 due to the sparseness of the peripheral display 104 (e.g., the peripheral display 104 can include fewer elements (LEDs) to be driven as compared to the primary display 102). According to other examples, however, it is to be appreciated that the primary display 102 and the peripheral display 104 can have substantially similar refresh rates. By way of yet other examples, a refresh rate of the primary display 102 can be higher than a refresh rate of the peripheral display 104.

The peripheral display 104 can be a sparse, non-focusable display, for instance. As such, the peripheral display 104 need not include optics to enable a user to focus on the complementary content displayed on the peripheral display 104. The peripheral display 104 need not be in a focus range of the eyes of the user, but can provide contextually relevant information to increase immersion, field of view, and situation awareness. For instance, due to the proximity of the primary display 102 to the eyes of the user (e.g., on the order of one or a few centimeters), the primary display 102 can include optics designed to enable the graphical content to appear as though it is at a greater distance from the eyes of the user, which allows for focusing on the graphical content. In contrast, the peripheral display 104 can lack such optics. Yet, according to other examples, it is to be appreciated that the peripheral display 104 can include such optics.

The peripheral display 104 expands the field of view in head mounted display device 100 (relative to a head mounted display device that lacks the peripheral display 104), while also enabling common nauseating effects of enlarged fields of view to be countered. The peripheral display 104 can enable a user of the head mounted display device 100 to have increased situational awareness, while also being less affected with simulator sickness or nausea compared to conventional head mounted display devices that lack the peripheral display 104. For instance, the peripheral rendering component 112 can render a peripheral countervection visualization and cause such visualization to be displayed on the peripheral display 104. The peripheral countervection visualization can be designed to reduce effects of simulator sickness by presenting motion stimulation on the retina that counters virtual motion included in the graphical content displayed on the primary display 102 that is not generated by motion of the user. Thus, the peripheral rendering component 112 can counter virtual motion in the graphical content based on controller movement, input received via a joystick, etc. (e.g., virtual motion in the graphical content that is not based on actual motion of the user).

In contrast to foveal vision, which senses details, colors, and textures, peripheral vision tends to be lower resolution and more attuned to sensing contrast and motion. Thus, the peripheral display 104, which targets the periphery, can have different requirements as compared to the primary display 102 for the fovea. The peripheral display 104 can be complementary to the high-resolution primary display 102 for the fovea.

Simulator sickness is a type of motion sickness induced by visual information that conflicts with vestibular and proprioceptive sensory cues. A source of simulator sickness can be induced perception of self-motion, or vection, caused by motion cues in a visual field that are not corroborated by vestibular sensory data. In turn, vection can be derived from visual cues with a central visual field playing a relatively small role.

Conventional wide field of view displays often induce simulator sickness more easily as compared to narrow field of view displays. However, because wide field of view displays also result in higher presence and immersion, selecting an appropriate field of view may be difficult. Moreover, various technical difficulties in producing devices with wide fields of view, such as complicated optics and increased weight, often limit the available fields of view of conventional head mounted display devices (which can detrimentally impact virtual experiences available to users of such devices).

Some conventional head mounted display devices provide wider fields of view. However, these conventional devices commonly have reduced image quality across the display. For instance, some conventional wide field of view head mounted display devices employ significant rendering power, while providing displays that are diffraction-limited. Other traditional wide field of view devices attempt to widen the field of view with complex optical configurations, which can be challenging to manufacture, design, and introduce optical distortions that are difficult to mitigate. Still other traditional approaches employ warping approaches that result in enlarged fields of view, but physical accuracy is detrimentally impacted by such approaches. In contrast to the foregoing, the head mounted display device 100 includes the peripheral display 104, which can display complementary content generated based on graphical content displayed on the primary display 102.

Figure 2:
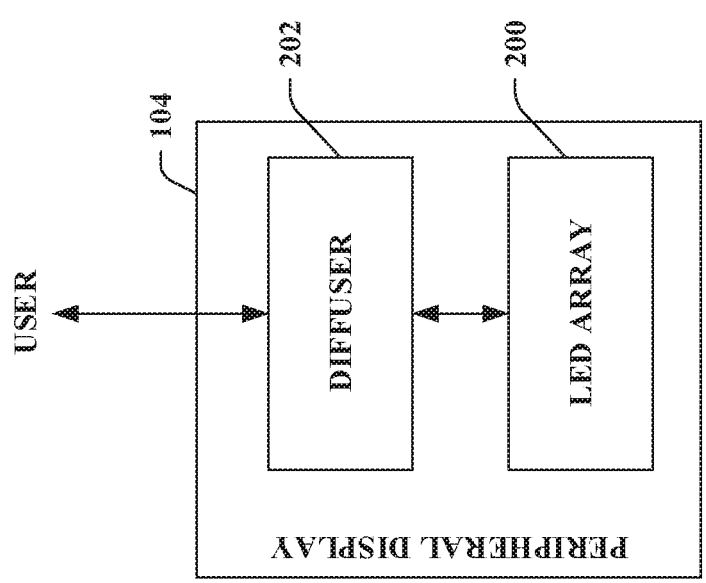
FIG. 2 illustrates a functional block diagram of an exemplary peripheral display in accordance with various embodiments.

Turning to FIG. 2, illustrated is an example of the peripheral display 104 in accordance with various embodiments. In the example set forth in FIG. 2, the peripheral display 104 includes an LED array 200 and a diffuser 202. The diffuser 202 covers the LED array 200. Thus, the diffuser 202 can cause light emitted by the LEDs of the LED array 200 to be blurred when viewed by a user. The peripheral display 104 can include substantially any number of LEDs in the LED array 200. Moreover, the LEDs in the LED array 200 can be RGB LEDs (e.g., each LED in the LED array 200 can include a triplet of red, green, and blue LEDs that can be controlled to output a particular color); however, the claimed subject matter is not so limited.

According to an example, the LEDs in the LED array 200 can be connected in series to a processor (e.g., the processor 106) and individually addressable. For instance, the LEDs can provide 24-bit color (e.g., eight bits per channel) and can employ a single control wire to control any number of LEDs wired in series. According to an illustration, due to the brightness of the LEDs in the LED array 200 coupled with the proximity of the LEDs to the eyes of a user, the LED array 200 can be covered with the diffuser 202, which can be formed of a diffuser material that absorbs some of the light and smooths out LED hotspots. By way of example, the diffuser material from which the diffuser 202 is formed can be an engineering thermoplastic such as polyoxymethylene (POM), acetal, polyacetal, polyformaldehyde, or the like. While FIG. 2 shows the peripheral display 104 including the diffuser 202, it is to be appreciated that the peripheral display 104 need not include a diffuser in other embodiments (e.g., the LED array 200 need not be covered by a diffuser).

Moreover, the LEDs in the LED array 200 can be calibrated so that the LEDs match a brightness and color gamut of the primary display 102. As described herein, the peripheral rendering component 112 can compute a color value to be displayed at each LED in the LED array 200, and such data can be continuously streamed to the processor for controlling the LEDs in the LED array 200.

Figure 3:
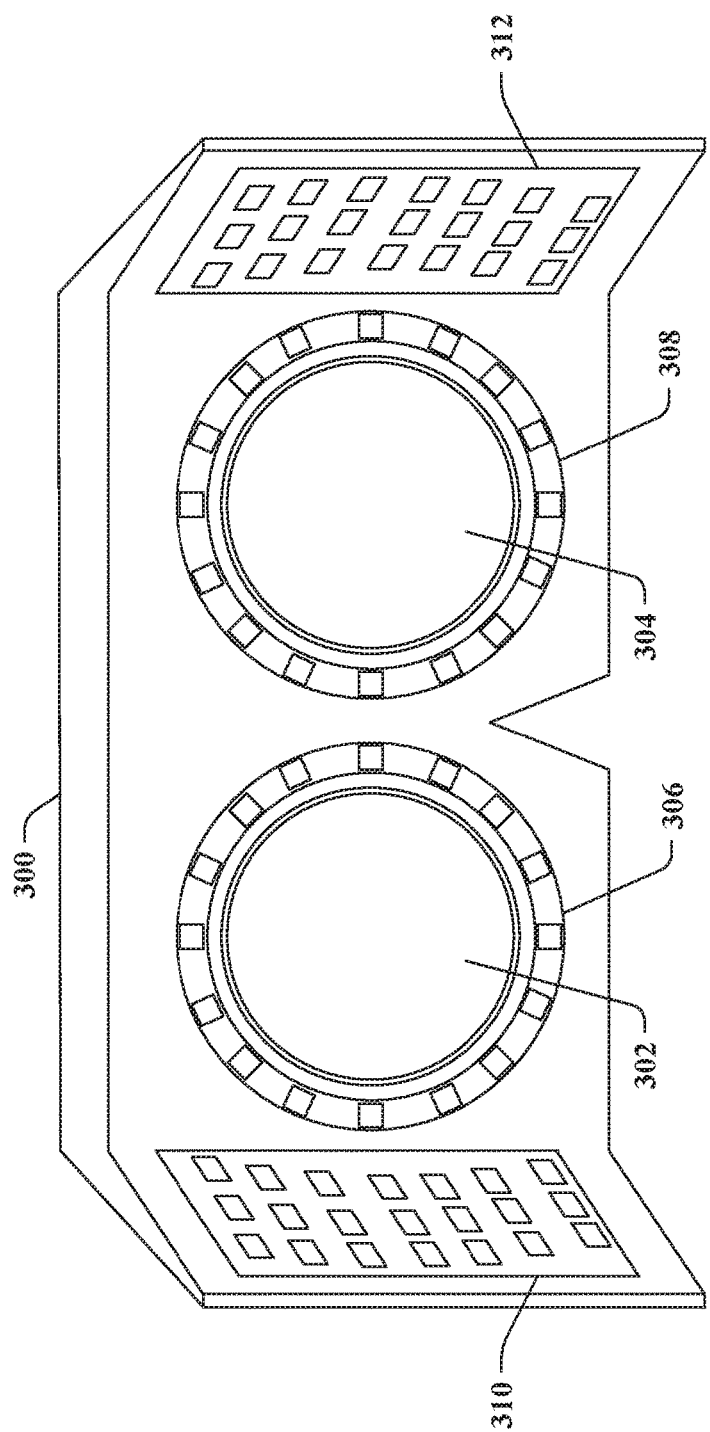
FIG. 3 illustrates a view of an exemplary head mounted display device that includes a primary display and a peripheral display.

Now turning to FIG. 3, illustrated is an exemplary head mounted display device 300 (e.g., the head mounted display device 100) that includes a primary display (e.g., the primary display 102) and a peripheral display (e.g., the peripheral display 104). The head mounted display device 300 can be a virtual reality display. As shown in FIG. 3, the primary display can include a left eye display 302 and a right eye display 304. The right eye display 304 is separated from the left eye display 302.

Moreover, the peripheral display of the head mounted display device 300 includes a left perimeter display 306 positioned to at least partially surround the left eye display 302. The peripheral display of the head mounted display device 300 further includes a right perimeter display 308 positioned to at least partially surround the right eye display 304. The peripheral display can also include a left far periphery display 310 positioned relative to the left perimeter display 306 such that the left far periphery display 310 is placed farther from the left eye display 302 as compared to the left perimeter display 306. The peripheral display also can include a right far periphery display 312 positioned relative to the right perimeter display 308 such that the right far periphery display 312 is placed farther from the right eye display 304 as compared to the right perimeter display 308. The left far periphery display 310 and the right far periphery display 312 can be located in the head mounted display device 300 to be in a far periphery region of a visual field of view of a user when the user is wearing the head mounted display device 300.

The left eye display 302 and the right eye display 304 can provide a central display for the head mounted display device 300. According to an example, the left eye display 302 and the right eye display 304 can each be a central high-resolution display of 960×1080 per eye, which can be updated at 75 Hz. Following this example, a binocular field of view provided by the left eye display 302 and the right eye display 304 can be approximately 84° horizontal. However, the claimed subject matter is not limited to the foregoing example of the left eye display 302 and the right eye display 304.

As depicted in FIG. 3, the peripheral display can include a number of LEDs separated into distinct groups, namely, the left perimeter display 306, the right perimeter display 308, the left far periphery display 310, and the right far periphery display 312. In particular, two groups of LEDs of the peripheral display are placed in the far periphery inside the left and right edges of the head mounted display device 300 (e.g., the left far periphery display 310 and the right far periphery display 312) and another two groups of LEDs of the peripheral display are configured as rings in the near periphery surrounding the left eye display 302 and the right eye display 304 (e.g., the left perimeter display 306 and the right perimeter display 308). As noted above (although not shown in FIG. 3), it is contemplated that a diffuser (e.g., the diffuser 202, a plastic cover) can be placed over the LEDs of the peripheral display to diffuse light.

By way of example, a total sparse field of view provided by the peripheral display shown in FIG. 3 can be approximately 170° horizontal; however, the claimed subject matter is not so limited. Moreover, the sparse peripheral display can be driven at a refresh rate that is higher than a refresh rate of the primary display. For instance, the sparse peripheral display can be driven at 100 Hz, whereas the primary display may have a refresh rate of 75 Hz; yet, the claimed subject matter is not limited to the foregoing refresh rates (or to the peripheral display and the primary display being driven at differing refresh rates).

Pursuant to an example, it is contemplated that a subset of the LEDs included in the left perimeter display 306 and the right perimeter display 308 can be disabled to mitigate crosstalk (e.g., LEDs in the left perimeter display 306 and the right perimeter display 308 positioned above a nose location and that may be seen by both eyes of a user can be disabled to mitigate crosstalk). In accordance with another example, the left perimeter display 306 and the right perimeter display 308 need not include such LEDs positioned above the nose location that may be seen by both eyes (e.g., positions that may conflict) and/or be covered by the nose. Thus, it is to be appreciated that the left perimeter display 306 and the right perimeter display 308 need not completely surround the left eye display 302 and the right eye display 304, respectively (e.g., the left perimeter display 306 can be an open ring positioned to partially surround the left eye display 302 and the right perimeter display 308 can be an open ring positioned to partially surround the right eye display 304).

By way of another example, a peripheral display of a head mounted display device can include the left perimeter display 306 and the right perimeter display 308, which can respectively wrap around (at least partially) the left eye display 302 and the right eye display 304. Following this example, LEDs in an LED array of the left perimeter display 306 can be positioned such that the LEDs are increasing sparse as distance from the left eye display 302 increases. Likewise, LEDs in an LED array of the right perimeter display 308 can be positioned such that the LEDs are increasing sparse as distance from the right eye display 304 increases.

Figure 4:
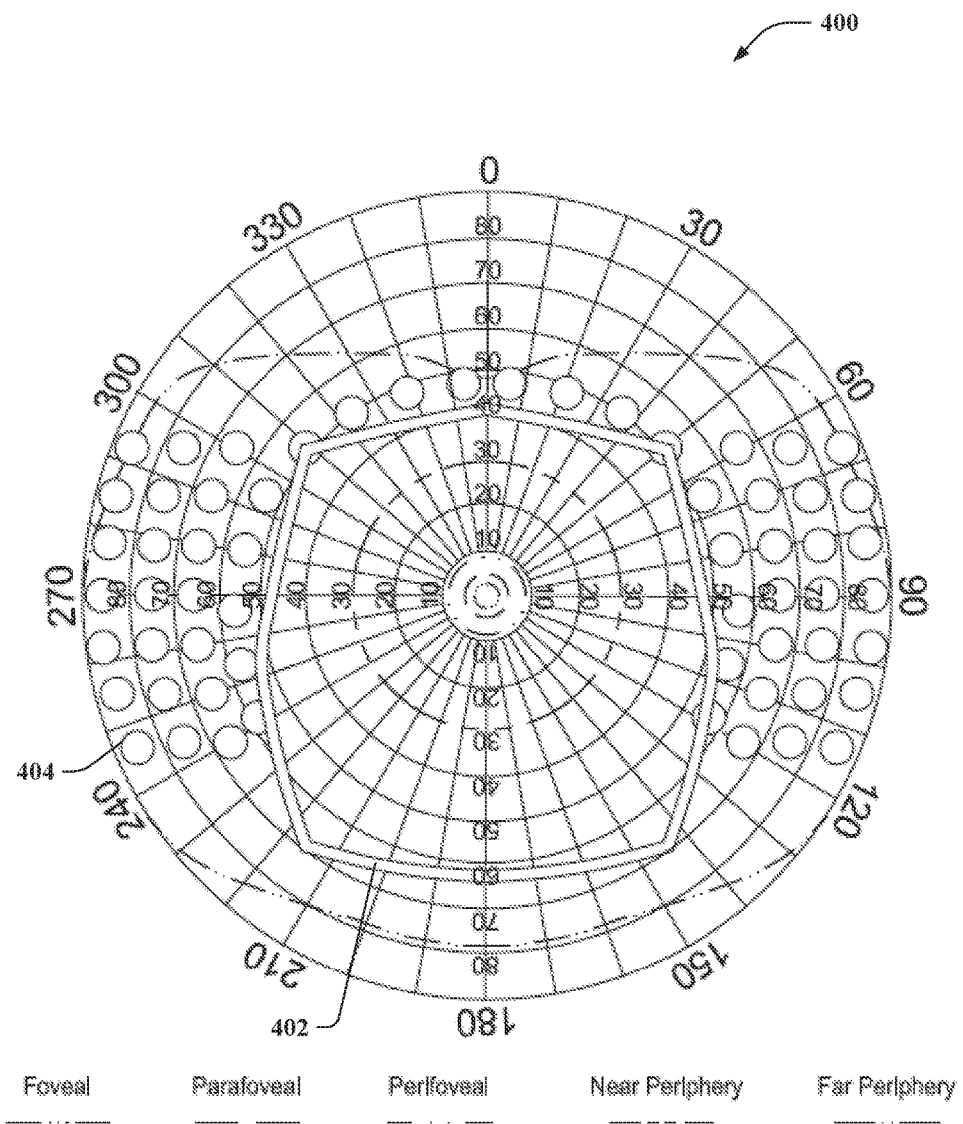
FIG. 4 illustrates an exemplary diagram showing a visual field of view of human vision.

Now referring to FIG. 4, illustrated is a diagram 400 showing a visual field of view of human vision. The diagram 400 depicts boundaries of a foveal region, a parafoveal region, a perifoveal region, a near periphery region, and a far periphery region of the field of view of human vision. Moreover, a binocular field of view 402 for the left eye display 302 and the right eye display 304 from the head mounted display device 300 of FIG. 3 is depicted in FIG. 4. Thus, the primary display of the head mounted display device 300 can provide the binocular field of view 402 represented in FIG. 4. The diagram 400 also depicts placement of LEDs included in the peripheral display of the head mounted display device 300 of FIG. 3 relative to the field of view of human vision. The LEDs included in the left perimeter display 306, the right perimeter display 308, the left far periphery display 310, and the right far periphery display 312 are represented as circles (such as LED 404) in FIG. 4. As illustrated in FIG. 4, the LEDs included in the peripheral display of the head mounted display device 300 of FIG. 3 are positioned to be in the far periphery region of the field of view of human vision.

Figure 5:
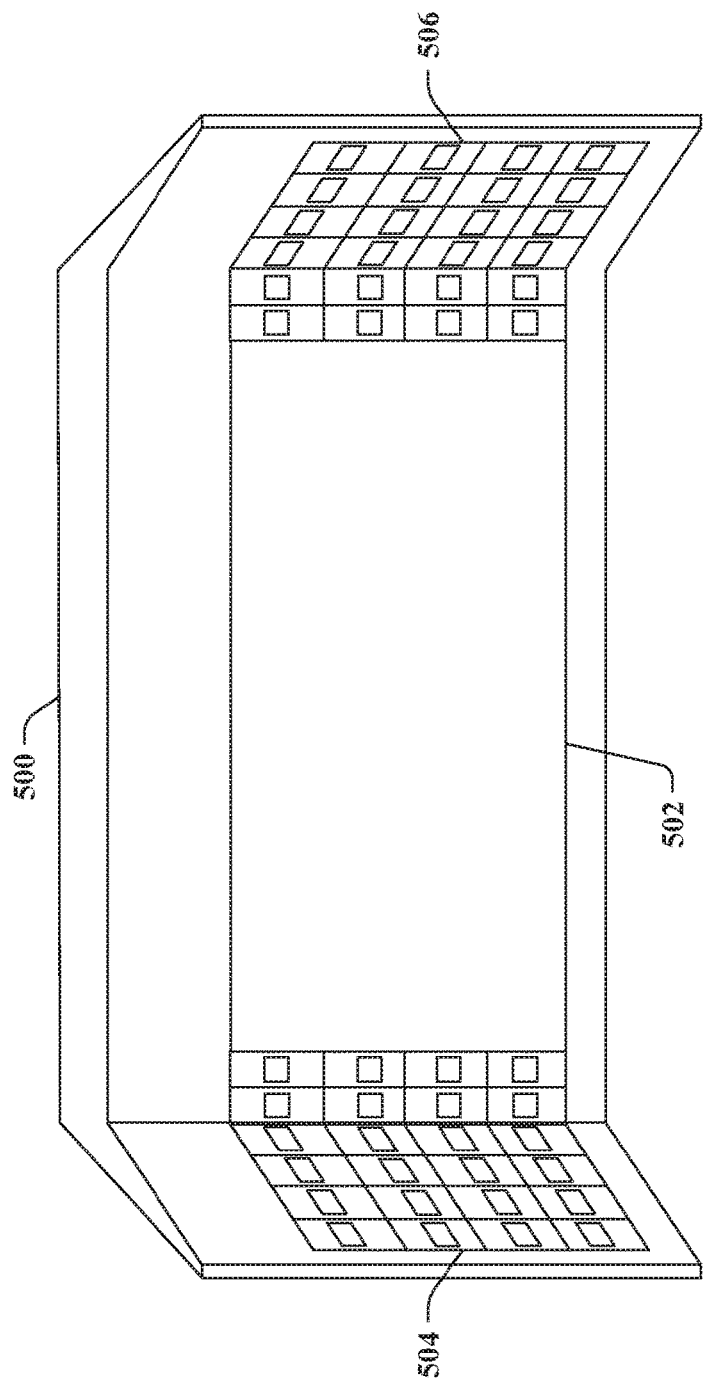
FIG. 5 illustrates a view of another exemplary head mounted display device that includes a primary display and a peripheral display.

With reference to FIG. 5, illustrated is another exemplary head mounted display device 500 (e.g., the head mounted display device 100). The head mounted display device 500 can be an augmented reality device. Again, the head mounted display device 500 includes a primary display (e.g., the primary display 102) and a peripheral display (e.g., the peripheral display 104). The primary display of the head mounted display device 500 can include an optically see-through near-eye display 502. The optically see-through near-eye display 502 can display graphical content overlaid onto an environment creating a see-through augmented reality experience.

The peripheral display of the head mounted display device 500 includes a first curved display 504 and a second curved display 506. The first curved display 504 can be positioned relative to the optically see-through near-eye display 502 such that the first curved display 504 extends into a far periphery region. Moreover, the second curved display 506 can be positioned relative to the optically see-through near-eye display 502 such that the second curved display 506 extends into the far periphery region. Further, the optically see-through near-eye display 502 is positioned between the first curved display 504 and the second curved display 506.

The optically see-through near-eye display 502 can provide a resolution of 1280×1440 per eye at a refresh rate of 60 frames per second. The horizontal field of view of the optically see-through near-eye display 502, for instance, can be approximately 60° horizontal. Yet, the claimed subject matter is limited to the foregoing.

Moreover, the first curved display 504 and the second curved display 506 can include substantially any number of LEDs. The LEDs of the first curved display 504 and the second curved display 506 can be arranged in rectangular matrices, one along each edge of the head mounted display device 500. Accordingly, a field of view that results from the optically see-through near-eye display 502, the first curved display 504, and the second curved display 506 can exceed 190° horizontal; however, the claimed subject matter is not so limited.

It is contemplated that the LED arrays included in the first curved display 504 and the second curved display 506 can be opaque. Further, a region above and below the optically see-through near-eye display 502 can be left clear to preserve environmental peripheral cues (e.g., a top area and bottom area of a field of view can be left clear). However, according to another example, it is contemplated that smaller LEDs can be included in the first curved display 504 and the second curved display 506; the smaller LEDs can enable the environment to remain visible in spaces between the LEDs of the peripheral display.

Again, it is contemplated that a refresh rate of the primary display (e.g., the optically see-through near-eye display 502) can be lower than a refresh rate of the peripheral display (e.g., the first curved display 504 and the second curved display 506). For instance, the peripheral display can be updated 75 times per second. However, the claimed subject matter is not so limited (e.g., a refresh rate other than 75 Hz can be supported by the peripheral display, the primary display and the peripheral display can employ substantially similar refresh rates, the refresh rate of the primary display can be higher than the refresh rate of the peripheral display).

According to an illustration, the head mounted display device 500 can include a mobile device mounted across a top of a headset of the head mounted display device 500. The mobile device can be connected to an external inertial measurement unit. Moreover, collimating lenses opposite the optically see-through near-eye display 502 can split a display output into two halves, one per eye, with each image individually projected at infinity. Moreover, a mirror can be mounted at a 45° angle between the display and the lenses can redirect the collimated images onto the eyes. However, the claimed subject matter is not limited to the foregoing illustration.

Figure 6:
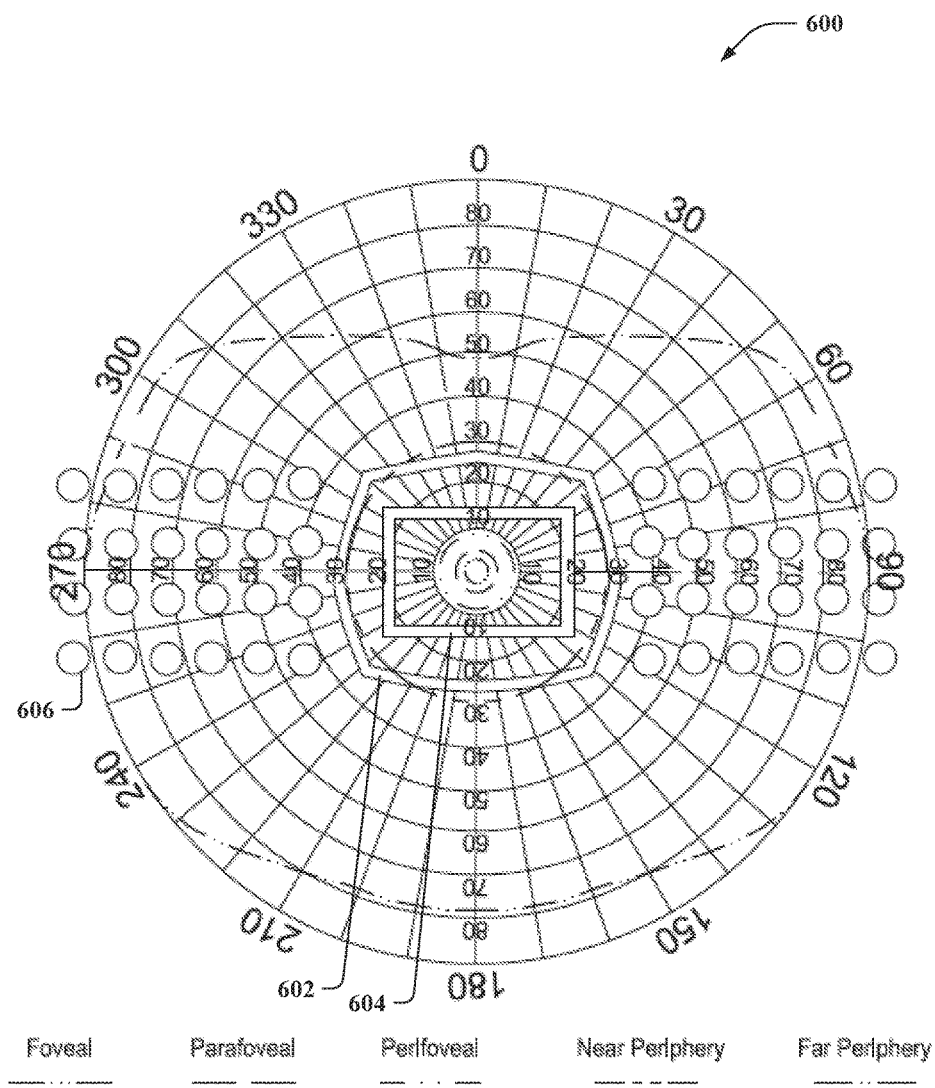
FIG. 6 illustrates another exemplary diagram showing a visual field of view of human vision.

Turning to FIG. 6, illustrated is another diagram 600 showing a visual field of view of human vision. Again, the diagram 600 depicts boundaries of the foveal region, the parafoveal region, the perifoveal region, the near periphery region, and the far periphery region of the field of view of human vision. Moreover, a binary field of view 602 of the optically see-through near-eye display 502 from the head mounted display device 500 of FIG. 5 is shown in FIG. 6. FIG. 6 also depicts another field of view 604 of a differing augmented reality device for purposes of comparison. The diagram 600 further depicts placement of LEDs included in the peripheral display of the head mounted display device 500 of FIG. 5 relative to the field of view of human vision. The LEDs included in the first curved display 504 and the second curved display 506 are again represented as circles (such as LED 606) in FIG. 6. Moreover, the LEDs of the peripheral display of the head mounted display device 500 of FIG. 5 are positioned to be in the far periphery region (or beyond the far periphery region such as the LED 606) of the field of view of human vision.

Figure 7:
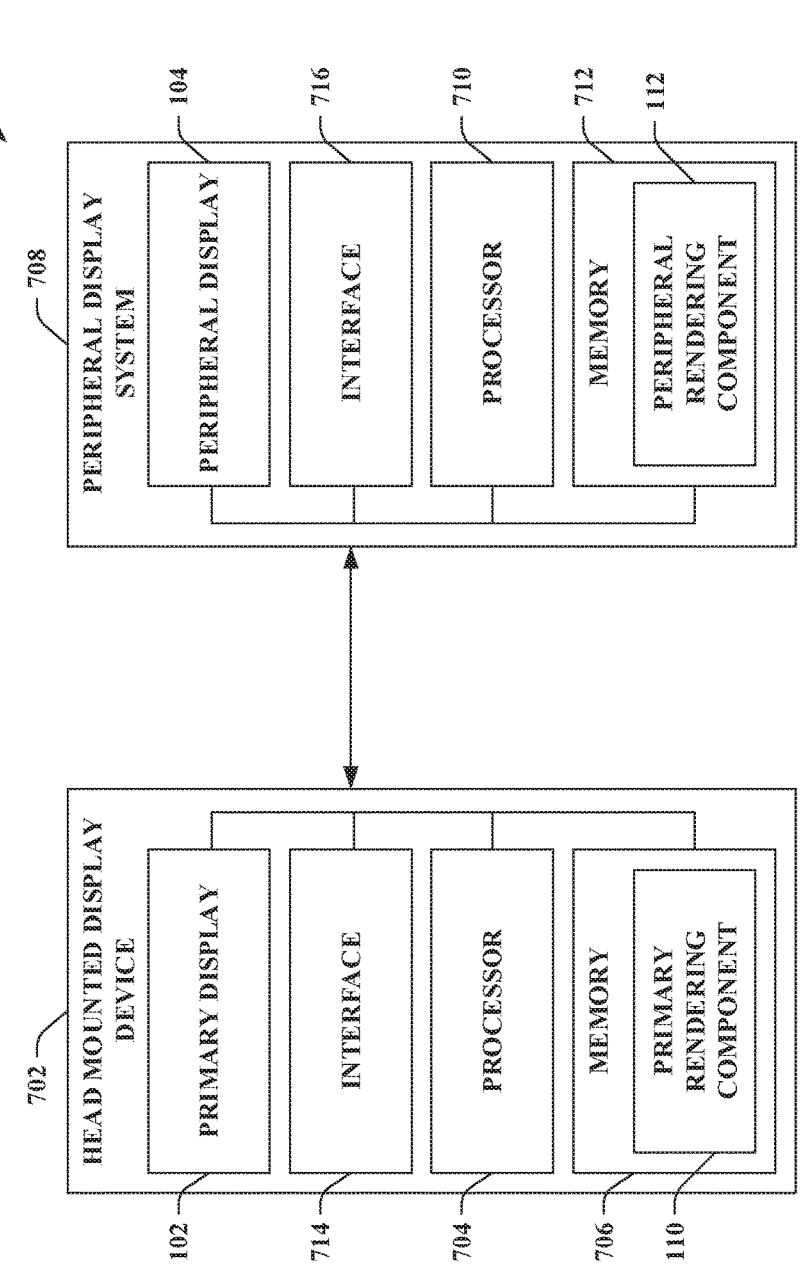
FIG. 7 illustrates a functional block diagram of an exemplary system that includes a head mounted display device.

Turning to FIG. 7, illustrated is a system 700 that includes a head mounted display device 702. The head mounted display device 702 includes the primary display 102, at least one processor 704, and memory 706. The processor 704 is configured to execute instructions loaded into the memory 706. In the example set forth in FIG. 7, the memory 706 of the head mounted display device 702 can include the primary rendering component 110 configured to render graphical content and cause the graphical content to be displayed on the primary display 102.

The system 700 further includes a peripheral display system 708. The head mounted display device 702 can be retrofitted to include the peripheral display system 708. Thus, the peripheral display system 708 can be a kit that can be added to the head mounted display device 702.

The peripheral display system 708 includes the peripheral display 104, which is attachable to the head mounted display device 702. When attached to the head mounted display device 702, the peripheral display 104 can be positioned relative to the primary display 102 of the head mounted display device 702 such that an overall field of view provided by the primary display 102 and the peripheral display 104 is extended compared to a field of view of the primary display 102. The peripheral display system 708 can further include at least one processor 710 and memory 712. Again, the processor 710 is configured to execute instructions loaded into the memory 712. Moreover, the memory 712 can include the peripheral rendering component 112.

The head mounted display device 702 further includes an interface 714. Moreover, the peripheral display system 708 further includes an interface 716. The interface 714 of the head mounted display device 702 and the interface 716 of the peripheral display system 708 are configured to exchange data there between. For instance, data describing the graphical content displayed on the primary display 102 can be transmitted via the interface 714 and received via the interface 716. It is contemplated that the interface 714 and the interface 716 can employ substantially any type of wired and/or wireless connection to exchange data there between.

According to other examples, it is contemplated that the peripheral display system 708 need not include the processor 710 and the memory 712. Rather, the memory 706 of the head mounted display device 702 can include the peripheral rendering component 112, which can be executable by the processor 704. Accordingly, the complementary content rendered by the peripheral rendering component 112 can be sent via the interface 714 to the interface 716 for display on the peripheral display 104 of the peripheral display system 708.

Figure 8:
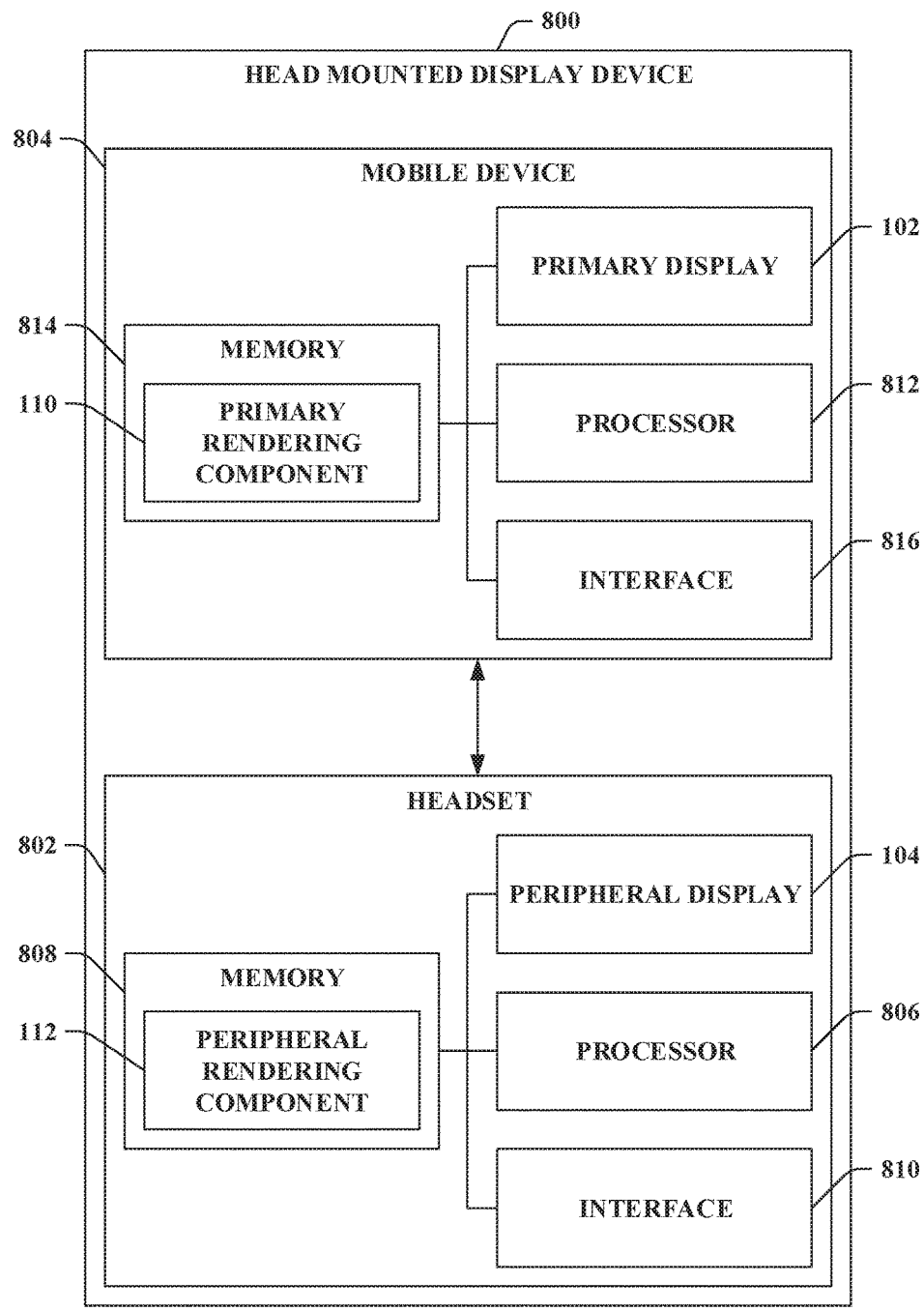
FIG. 8 illustrates a functional block diagram of another exemplary head mounted display device.

Referring now to FIG. 8, illustrated is another exemplary head mounted display device 800. The head mounted display device 800 includes a headset 802 and a mobile device 804. The mobile device 804 can be removably attachable to the headset 802. The mobile device 804, for example, can be a mobile phone (e.g., a smart phone). Yet, according to other examples, it is contemplated that the mobile device 804 can be a tablet computer, a handheld computer, a laptop computer, a wearable computer, a personal digital assistant (PDA), a portable gaming device, or the like.

According to an example, the headset 802 can include the peripheral display 104, at least one processor 806, and memory 808. The processor 806 is configured to execute instructions loaded into the memory 808, and the memory 808 can include the peripheral rendering component 112. Moreover, the headset 802 can include an interface 810 configured to transmit data to the mobile device 804 and/or receive data from the mobile device 804.

Further, the mobile device 804 can include the primary display 102, at least one processor 812, and memory 814. The processor 812 is configured to execute instructions loaded into the memory 814. Moreover, the memory 814 can include the primary rendering component 110. The mobile device 804 can further include an interface 816 configured to transmit data to and/or receive data from the interface 810 of the headset 802.

Figure 9:
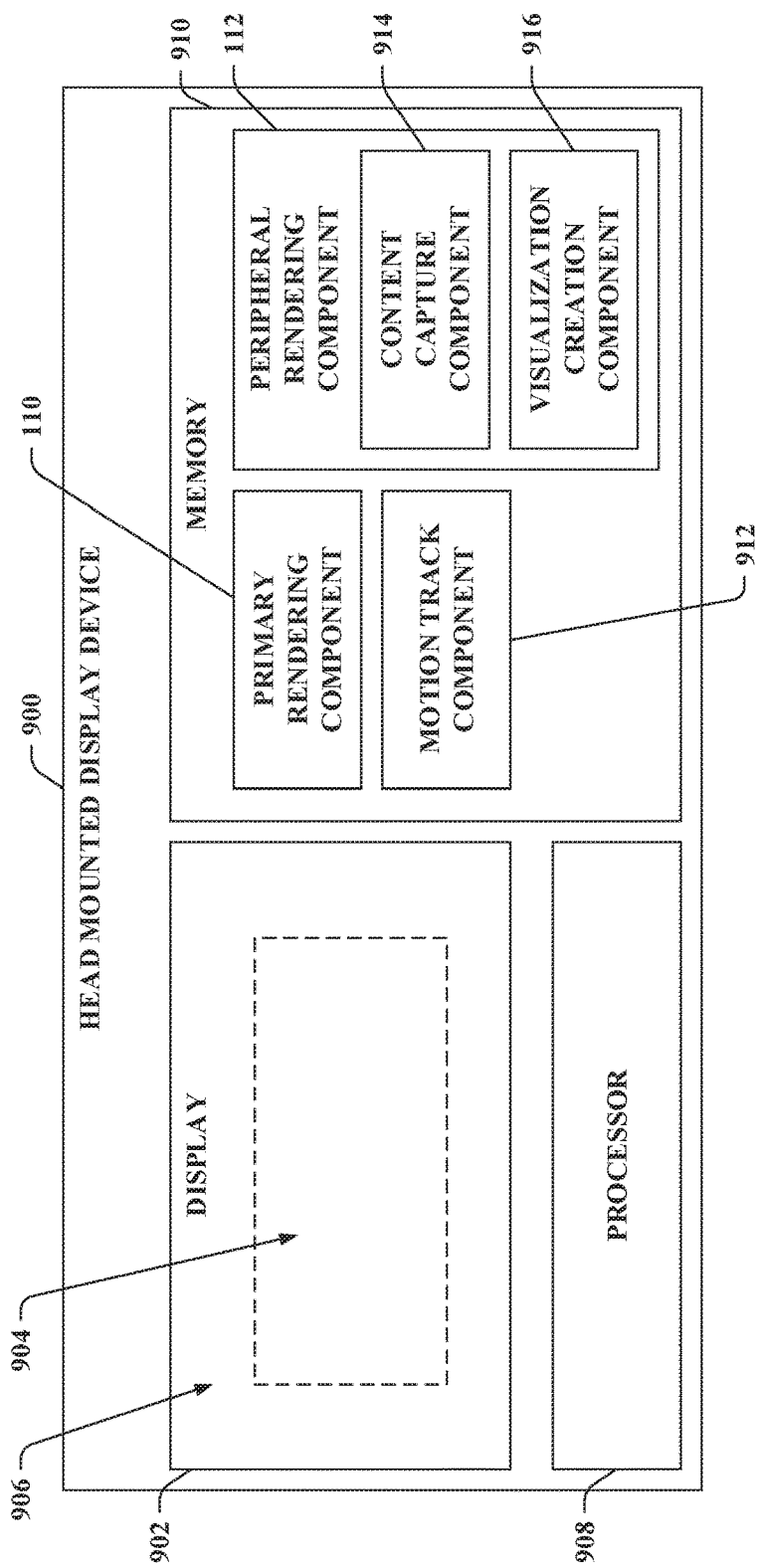
FIG. 9 illustrates a functional block diagram of yet another exemplary head mounted display device.

With reference to FIG. 9, illustrated is yet another exemplary head mounted display device 900. The head mounted display device 900 includes a display 902. The display 902 includes a central portion 904 and a periphery portion 906. A user of the head mounted display device 900 can focus on the central portion 904 of the display 902, while the periphery portion 906 of the display 902 may be viewable in a far periphery region of a field of view of human vision. While the periphery portion 906 is depicted to completely surround the central portion 904 of the display 902, it is to be appreciated that the claimed subject matter is not so limited (e.g., the periphery portion 906 may not be below the central portion 904, the periphery portion 906 may not be above the central portion 904). Moreover, it is to be appreciated that the central portion 904 and the periphery portion 906 of the display 902 may or may not abut. According to an example, the central portion 904 of the display 902 may be the primary display 102 and the periphery portion 906 of the display 902 may be the peripheral display 104. By way of yet another example, the central portion 904 and the periphery portion 906 may be different parts of a common display (e.g., the central portion 904 and the periphery portion 906 can be integrated into the common display).

The head mounted display device 900 further includes at least one processor 908 and memory 910, where the processor 908 is configured to execute instructions loaded into the memory 910. The memory 910 includes the primary rendering component 110 and the peripheral rendering component 112. The primary rendering component 110 can cause the graphical content to be displayed on the central portion 904 of the display 902. Moreover, the peripheral rendering component 112 can render the complementary content based on the graphical content displayed on the central portion 904 of the display 902. The peripheral rendering component 112 can further cause the complementary content to be displayed on the periphery portion 906 of the display 902.

The memory 910 further includes a motion track component 912. The motion track component 912 can be configured to track actual motion of a user of the head mounted display device 900. Further, the motion track component 912 can be configured to output motion information that specifies the actual motion of the user of the head mounted display device 900. For instance, the motion track component 912 can track physical head movement of the user of the head mounted display device 900. The peripheral rendering component 112 can receive the motion information that specifies the actual motion of the user of the head mounted display device 900 outputted by the motion track component 912. The peripheral rendering component 112 can further render the complementary content based on the graphical content displayed on the central portion 904 of the display 902 (e.g., the primary display 102) and the motion information.

The peripheral rendering component 112 can further include a content capture component 914. The content capture component 914 can capture parts of the graphical content displayed on the central portion 904 of the display 902. Moreover, the peripheral rendering component 112 can include a visualization creation component 916 that can detect virtual motion included in the graphical content displayed on the central portion 904 of the display 902 based on the captured parts of the graphical content. The visualization creation component 916 can further detect a mismatch between the actual motion of the user specified by the motion information (e.g., received from the motion track component 912) and the virtual motion included in the graphical content displayed on the central portion 904 of the display 902 by the head mounted display device 900. Such mismatch can conventionally cause the user of the head mounted display device 900 to experience vection. Responsive to detecting the mismatch, the visualization creation component 916 can create an optical flow that moves in a direction of the virtual motion included in the graphical content. Moreover, the visualization creation component 916 can cause the optical flow to be displayed on the periphery portion 906 of the display 902 (e.g., the peripheral display 104); thus, the complementary content generated by the peripheral rendering component 112 can include the optical flow. Accordingly, the optical flow can provide a peripheral countervection visualization that can reduce effects of simulator sickness. The optical flow displayed on the periphery portion 906 of the display 902 shows movement in an opposite direction from a flow detected on the central portion 904 of the display 902 (e.g., to counter effects of the flow on the central portion 904 of the display that does not match actual motion of the user).

According to an example, the content capture component 914 can provide a plurality of light probes in a virtual scene displayed on the central portion 904 of the display 902. Pursuant to an illustration where the periphery portion 906 of the display 902 is the peripheral display 104 which includes an array of LEDs, each of the light probes can be used to update a corresponding one of the LEDs in the array. The light probes can be positioned in the virtual scene displayed on the central portion 904 of the display 902 (e.g., the primary display 102) to match an arrangement of the LEDs of the peripheral display 104 that they are representing. Such a configuration can be updated as the virtual scene is traversed by the user of the head mounted display device 900.

For each eye, a virtual camera can render the scene into a color buffer. The color buffer can be partitioned using a Voronoi diagram, assigning each pixel in the buffer to a nearest light probe. An output color for each light probe can be an average color of pixels assigned to such light probe. Accordingly, it is contemplated that objects in a field of view can contribute to at least one light probe provided by the content capture component 914, which can allow for various sizes of details to be included in the complementary content generated by the peripheral rendering component 112.

Again following the illustration where the periphery portion 906 includes the array of LEDs, the actual color values sent to the LEDs by the peripheral rendering component 112 can be gamma-adjusted to match the gamma of the central portion 904 of the display 902 and then multiplied by predetermined per-channel scale factors. The scale factors, for instance, can correct for color gamut mismatches and brightness discrepancies. Matching the gamut and brightness can enable providing an experience that is more seamless and comfortable for longer use by the user.

The visualization creation component 916 can create the complementary content to be displayed on the periphery portion 906 of the display 902. According to an example, the visualization creation component 916 can extend the field of view from the central portion 904 to the periphery portion 906. Additionally or alternatively, the visualization creation component 916 can use the periphery portion 906 of the display 902 to highlight a particular feature or style. Examples of the visualizations that can be generated by the visualization creation component 916 include a full environment visualization, an objects of interest visualization, and a countervection visualization.

For the full environment visualization, the visualization creation component 916 can use the periphery portion 906 of the display 902 to extend the field of view of the central portion 904. Objects and scenery from the graphical content displayed on the central portion 904 of the display 902 can be rendered into the periphery portion 906 of the display 902 using this visualization.

For the objects of interest visualization, the visualization creation component 916 can render select objects from the graphical content displayed on the central portion 904 of the display 902 in the periphery portion 906 of the display 902. This visualization can draw attention to a particular object in the periphery portion 906 that is currently not visible on a main foveal display (e.g., the central portion 904 of the display 902).

Moreover, for the countervection visualization, the visualization creation component 916 can attempt to counteract virtual motions not generated by the physical head movement of the user of the head mounted display device 900. This visualization can reduce negative effects of vection-induced simulator sickness caused by motion cues in the visual field.

Pursuant to an example, the countervection visualization can cause a series of vertical bars to be displayed in the periphery portion 906 of the display 902. The vertical bars can be placed in a spherical arrangement around a person's avatar and can be visible only in the periphery portion 906 (e.g., not visible in the central portion 904 of the display 902). The visualization creation component 916 does not alter the sphere responsive to physical head motions. Rather, when the user's avatar moves or rotates (e.g., due to user input), the visualization creation component 916 can shift the bars (e.g., via texture manipulation) so that the bars are moved in the same direction as the virtual motion (which is a direction opposite to what typically would occur). This movement of the bars can be referred to herein as an optical flow (or a countervection cue). The optical flow opposes the motion cues of the central portion 904 of the display 902 and thus reduce the feeling of vection (self-motion). By way of illustration, if a user walks forward, the bars will also move forward. According to an example, the bars can be moved slightly slower than the actual motion. Accordingly, the countervection visualization can partially cancel the vection experienced in the periphery portion 906.

According to a further example, the visualization creation component 916 can dynamically switch between visualizations. The visualization creation component 916 can render the full environment visualization while the user is not moving (e.g., no virtual motion) or when the movement comes from actual motion of the user (e.g., physical movement of the head of the user detected by the motion track component 912 causes the virtual motion). Moreover, the visualization creation component 916 can fade in countervection cues when the user begins to move via external input, such as a joystick (e.g., the external input causes the virtual motion). Thus, the visualization creation component 916 can fade in countervection cues when the person is experiencing visual-vestibular mismatch. This allows the user to attain the benefit of a wider field of view (e.g., enhanced immersion, more information) while also benefiting from reduced vection (e.g., reduced visual-vestibular conflict) of the countervection visualization.

By way of illustration, when the actual motion of the user and the virtual motion matches, the visualization creation component 916 can cause the periphery portion 906 of the display 902 to display content based on motion of the head of the user (e.g., if the head of the user is rotated to the left then the scene is rotated to the left on the periphery portion 906 of the display 902 as well as the central portion 904 of the display 902). Alternatively, when extra virtual motion is injected in the scene, where such virtual motion is not being experienced by a body of the user (e.g., there is a mismatch between the actual motion of the user and the virtual motion), then the visualization creation component 916 can cause the periphery portion 906 of the display 902 to display an optical flow in a direction opposite the flow of the virtual motion (e.g., if the virtual motion is in a forward direction due to input from a joystick while the head of the user is stationary then the periphery portion 906 of the display 902 can display an optical flow backwards).

Figure 10:
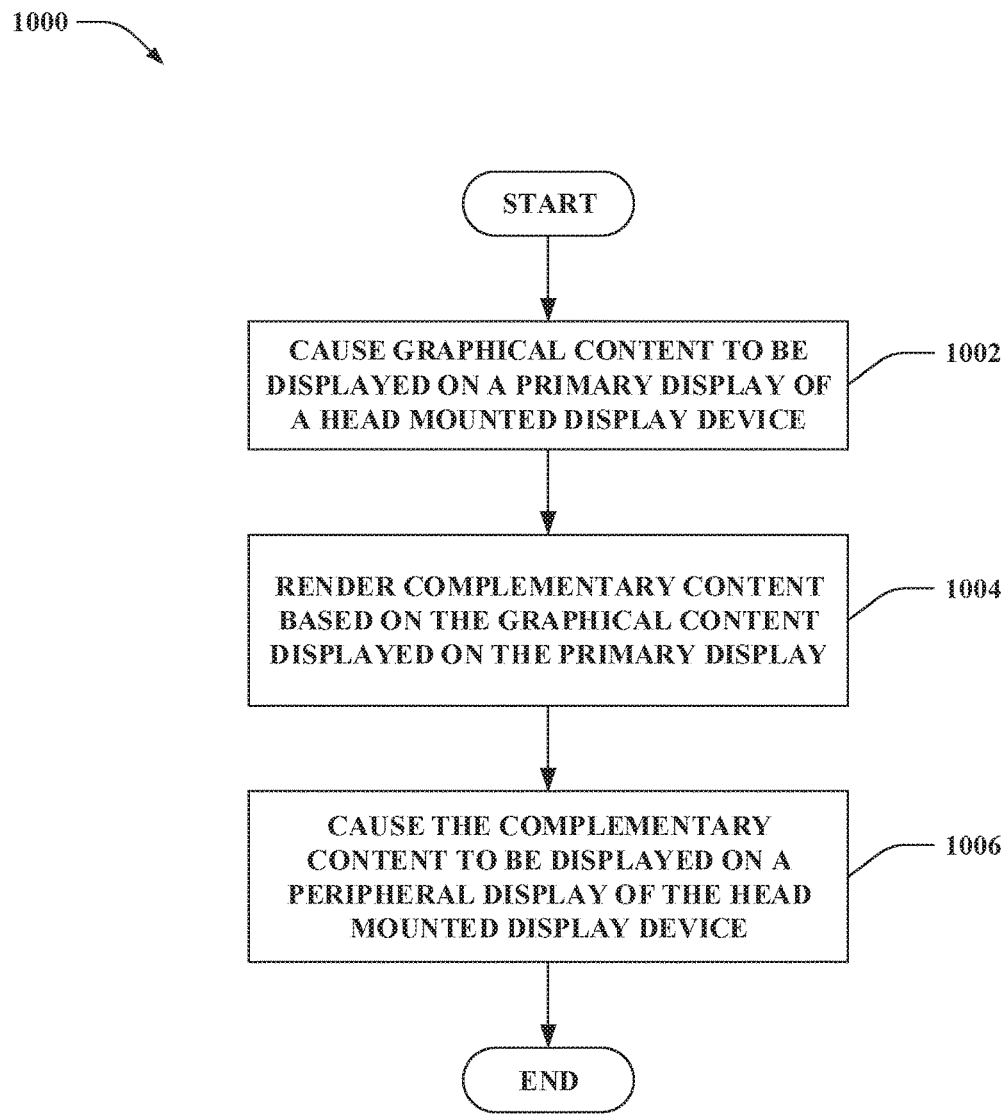
FIG. 10 is a flow diagram that illustrates an exemplary methodology of controlling operation of a head mounted display device.
Figure 11:
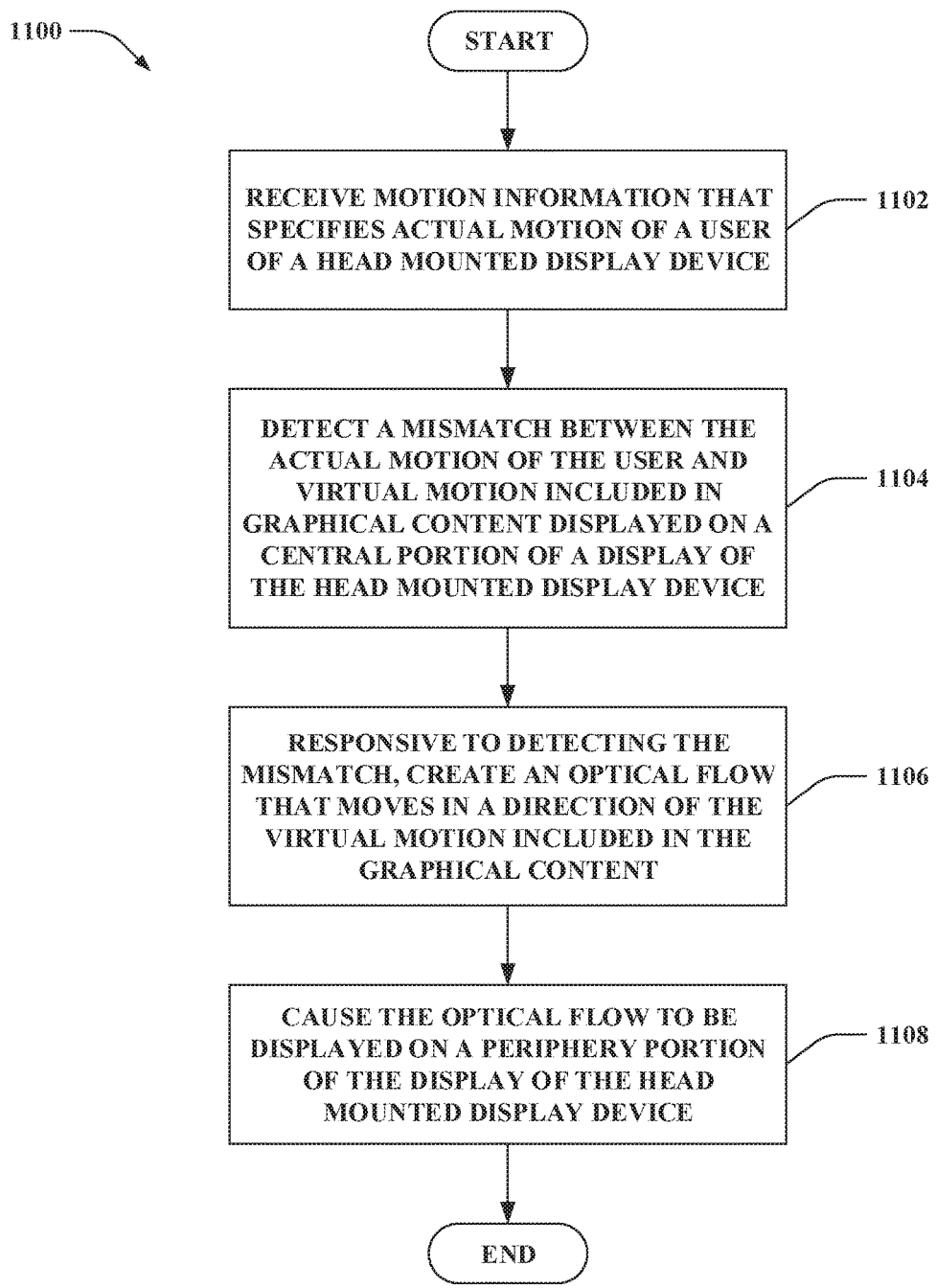
FIG. 11 is a flow diagram that illustrates another exemplary methodology of controlling operation of a head mounted display device.

FIGS. 10-11 illustrate exemplary methodologies relating to controlling operation of a head mounted display device. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 10 illustrates a methodology 1000 of controlling operation of a head mounted display device. The head mounted display device can include a primary display and a peripheral display. At 1002, graphical content can be caused to be displayed on the primary display of the head mounted display device. At 1004, complementary content can be rendered based on the graphical content displayed on the primary display. At 1006, the complementary content can be caused to be displayed on the peripheral display of the head mounted display device.

Turning to FIG. 11, illustrated is another methodology 1100 of controlling operation of a head mounted display device. At 1102, motion information that specifies actual motion of a user of the head mounted display device can be received. At 1104, a mismatch between the actual motion of the user specified by the motion information and virtual motion included in graphical content displayed on a central portion of a display of the head mounted display device can be detected. At 1106, responsive to detecting the mismatch, an optical flow that moves in a direction of the virtual motion included in the graphical content can be created. At 1108, the optical flow can be caused to be displayed on a periphery portion of the display of the head mounted display device.

Figure 12:
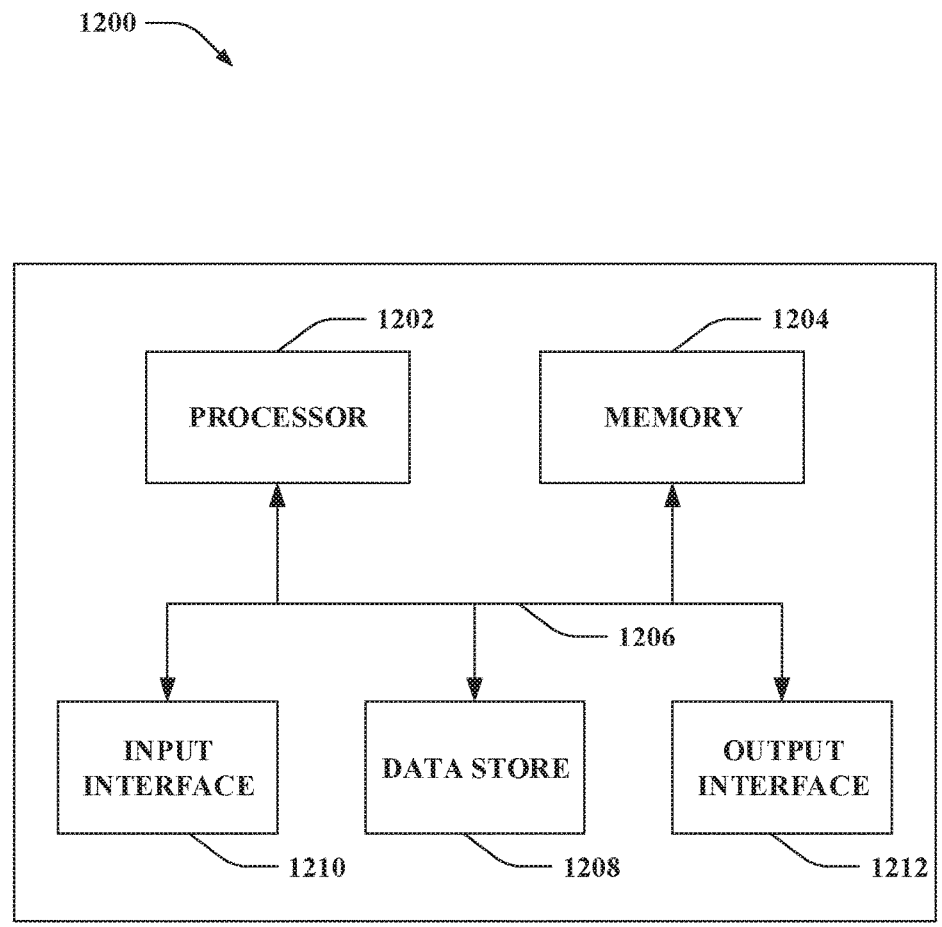
FIG. 12 illustrates an exemplary computing device.

Referring now to FIG. 12, a high-level illustration of an exemplary computing device 1200 that can be used in accordance with the systems and methodologies disclosed herein is illustrated. For instance, the computing device 1200 may be, include, or be included in a head mounted display device (e.g., the head mounted display device 100, the head mounted display device 300, the head mounted display device 500, the head mounted display device 702, the head mounted display device 800, the head mounted display device 900). According to another example, the computing device 1200 may be used in conjunction with a head mounted display device (e.g., the computing device 1200 may be, include, or be included in the peripheral display system 708 or the mobile device 804). The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store graphical content, complementary content, and so forth.

The computing device 1200 additionally includes a data store 1208 that is accessible by the processor 1202 by way of the system bus 1206. The data store 1208 may include executable instructions, graphical content, complementary content, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

It is contemplated that the external devices that communicate with the computing device 1200 via the input interface 1210 and the output interface 1212 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1200 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1200 may be a distributed system. Thus, for instance, several devices may be in communication by way of a network connection and may collectively perform tasks described as being performed by the computing device 1200.

Various examples are now set forth.

EXAMPLE 1

A head mounted display device, comprising: a primary display that provides a field of view, the primary display displays graphical content; a peripheral display, the peripheral display being positioned relative to the primary display such that an overall field of view provided by the primary display and the peripheral display is extended compared to the field of view of the primary display; at least one processor; and memory that comprises computer-executable instructions that, when executed by the at least one processor, cause the at least one processor to perform acts including: rendering complementary content based on the graphical content displayed on the primary display; and causing the complementary content to be displayed on the peripheral display.

EXAMPLE 2

The head mounted display device according to Example 1, wherein the peripheral display further comprises a light emitting diode (LED) array.

EXAMPLE 3

The head mounted display device according to any of Examples 1-2 being an augmented reality device.

EXAMPLE 4

The head mounted display device according to any of Examples 1-2 being a virtual reality device.

EXAMPLE 5

The head mounted display device according to any of Examples 1-4, wherein: the primary display further comprises: a left eye display; and a right eye display, the right eye display being separated from the left eye display; and the peripheral display further comprises: a left perimeter display positioned to at least partially surround the left eye display; and a right perimeter display positioned to at least partially surround the right eye display.

EXAMPLE 6

The head mounted display device according to Example 5, wherein the peripheral display further comprises: a left far periphery display positioned relative to the left perimeter display such that the left far periphery display is placed farther from the left eye display as compared to the left perimeter display; and a right far periphery display positioned relative to the right perimeter display such that the right far periphery display is placed farther from the right eye display as compared to the right perimeter display.

EXAMPLE 7

The head mounted display device according to any of Examples 1-4, wherein: the primary display further comprises an optically see-through near-eye display; the peripheral display further comprises: a first curved display positioned relative to the optically see-through near-eye display such that the first curved display extends to a far periphery region; and a second curved display positioned relative to the optically see-through near-eye display such that the second curved display extends to the far periphery region; and the optically see-through near-eye display is positioned between the first curved display and the second curved display.

EXAMPLE 8

The head mounted display device according to any of Examples 1-7, wherein a resolution of the primary display is higher than a resolution of the peripheral display.

EXAMPLE 9

The head mounted display device according to any of Examples 1-8, wherein a refresh rate of the primary display is lower than a refresh rate of the peripheral display.

EXAMPLE 10

The head mounted display device according to any of Examples 1-9, wherein the peripheral display is a sparse, non-focusable display.

EXAMPLE 11

The head mounted display device according to any of Examples 1-10, the memory further comprises computer-executable instructions that, when executed by the at least one processor, cause the at least one processor to perform acts including: receiving motion information that specifies actual motion of a user of the head mounted display device; and rendering the complementary content based on the graphical content displayed on the primary display and the motion information.

EXAMPLE 12

The head mounted display device according to Example 11, wherein rendering the complementary content based on the graphical content displayed on the primary display and the motion information further comprises: detecting a mismatch between the actual motion of the user specified by the motion information and virtual motion included in the graphical content displayed on the primary display; and responsive to detecting the mismatch, creating an optical flow that moves in a direction of the virtual motion included in the graphical content, and the complementary content comprises the optical flow for display on the peripheral display.

EXAMPLE 13

The head mounted display device according to any of Examples 1-12, the memory further comprises computer-executable instructions that, when executed by the at least one processor, cause the at least one processor to perform acts including: rendering the graphical content; and causing the graphical content to be displayed on the primary display.

EXAMPLE 14

The head mounted display device according to any of Examples 1-12, further comprising: at least one differing processor; and differing memory that comprises computer-executable instructions that, when executed by the at least one differing processor, cause the at least one differing processor to perform acts including: rendering the graphical content; and causing the graphical content to be displayed on the primary display.

EXAMPLE 15

A peripheral display system, comprising: a peripheral display, wherein: the peripheral display is attachable to a head mounted display device; and when attached to the head mounted display device, the peripheral display is positioned relative to a primary display of the head mounted display device such that an overall field of view provided by the primary display and the peripheral display is extended compared to a field of view of the primary display; at least one processor; and memory that comprises computer-executable instructions that, when executed by the at least one processor, cause the at least one processor to perform acts including: rendering complementary content based on graphical content displayed on the primary display; and causing the complementary content to be displayed on the peripheral display.

EXAMPLE 16

The peripheral display system according to Example 15, further comprising an interface configured to receive data describing the graphical content displayed on the primary display.

EXAMPLE 17

The peripheral display system according to any of Examples 15-16, the memory further comprises computer-executable instructions that, when executed by the at least one processor, cause the at least one processor to perform acts including: receiving motion information that specifies actual motion of a user of the head mounted display device; and rendering the complementary content based on the graphical content displayed on the primary display and the motion information.

EXAMPLE 18

A method of controlling operation of a head mounted display device, comprising: receiving motion information that specifies actual motion of a user of the head mounted display device; detecting a mismatch between the actual motion of the user specified by the motion information and virtual motion included in graphical content displayed on a central portion of a display of the head mounted display device; responsive to detecting the mismatch, creating an optical flow that moves in a direction of the virtual motion included in the graphical content; and causing the optical flow to be displayed on a periphery portion of the display of the head mounted display device.

EXAMPLE 19

The method according to Example 18, further comprising: causing the graphical content to be displayed on a primary display of the head mounted display device, the primary display provides a field of view; and causing the optical flow to be displayed on a peripheral display of the head mounted display device, the peripheral display being positioned relative to the primary display such that an overall field of view provided by the primary display and the peripheral display is extended compared to the field of view of the primary display.

EXAMPLE 20

The method according to Example 18, further comprising: causing the graphical content and the optical flow to be displayed on a common display of the head mounted display device.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A head mounted display device, comprising:
   a primary display that provides a field of view, the primary display displays graphical content;
   a peripheral display, the peripheral display being positioned relative to the primary display such that an overall field of view provided by the primary display and the peripheral display is extended compared to the field of view of the primary display, the peripheral display comprises fewer elements to be driven as compared to the primary display, the head mounted display device lacks optics to enable focusing on the peripheral display;
   at least one processor, and
   memory that comprises computer-executable instructions that, when executed by the at least one processor, cause the at least one processor to perform acts including:
     rendering complementary content based on the graphical content displayed on the primary display; and
     causing the complementary content to be displayed on the peripheral display.

2. The head mounted display device of claim 1, wherein the peripheral display further comprises a light emitting diode (LED) array.

3. The head mounted display device of claim 1 being an augmented reality device.

4. The head mounted display device of claim 1 being a virtual reality device.

5. The head mounted display device of claim 1, wherein:
the primary display further comprises:
  a left eye display; and
  a right eye display, the right eye display being separated from the left eye display; and
the peripheral display further comprises:
  a left perimeter display, the left perimeter display comprises a left ring positioned to at least partially surround the left eye display; and
  a right perimeter display, the right perimeter display comprises a right ring positioned to at least partially surround the right eye display.

6. The head mounted display device of claim 5, wherein the peripheral display further comprises:
  a left far periphery display positioned relative to the left perimeter display such that the left far periphery display is placed farther from the left eye display as compared to the left perimeter display; and
  a right far periphery display positioned relative to the right perimeter display such that the right far periphery display is placed farther from the right eye display as compared to the right perimeter display.

7. The head mounted display device of claim 1, wherein:
the primary display further comprises an optically see-through near-eye display,
the peripheral display further comprises:
  a first curved display positioned relative to the optically see-through near-eye display such that the first curved display extends to a far periphery region; and
  a second curved display positioned relative to the optically see-through near-eye display such that the second curved display extends to the far periphery region; and
the optically see-through near-eye display is positioned between the first curved display and the second curved display.

8. The head mounted display device of claim 1, wherein a resolution of the primary display is higher than a resolution of the peripheral display.

9. The head mounted display device of claim 1, wherein a refresh rate of the primary display is lower than a refresh rate of the peripheral display.

10. The head mounted display device of claim 1, the memory further comprises computer-executable instructions that, when executed by the at least one processor, cause the at least one processor to perform acts including:
  receiving motion information that specifies actual motion of a user of the head mounted display device; and
  rendering the complementary content based on the graphical content displayed on the primary display and the motion information.

11. The head mounted display device of claim 10, wherein rendering the complementary content based on the graphical content displayed on the primary display and the motion information further comprises:
  detecting a mismatch between the actual motion of the user specified by the motion information and virtual motion included in the graphical content displayed on the primary display; and
  responsive to detecting the mismatch, creating an optical flow that moves in a direction of the virtual motion included in the graphical content, and the complementary content comprises the optical flow for display on the peripheral display.

12. The head mounted display device of claim 1, the memory further comprises computer-executable instructions that, when executed by the at least one processor, cause the at least one processor to perform acts including:
  rendering the graphical content; and
  causing the graphical content to be displayed on the primary display.

13. The head mounted display device of claim 1, further comprising:
  at least one differing processor; and
  differing memory that comprises computer-executable instructions that, when executed by the at least one differing processor, cause the at least one differing processor to perform acts including:
    rendering the graphical content; and
    causing the graphical content to be displayed on the primary display.

14. A peripheral display system, comprising:
a peripheral display, wherein:
  the peripheral display is removably attachable to a head mounted display device; and
  when attached to the head mounted display device, the peripheral display is positioned relative to a primary display of the head mounted display device such that an overall field of view provided by the primary display and the peripheral display is extended compared to a field of view of the primary display;
at least one processor, and
memory that comprises computer-executable instructions that, when executed by the at least one processor, cause the at least one processor to perform acts including:
  detecting a mismatch between actual motion of a user of the head mounted display device and virtual motion included in graphical content displayed on the primary display;
  rendering complementary content based on graphical content displayed on the primary display and the mismatch; and
  causing the complementary content to be displayed on the peripheral display.

15. The peripheral display system of claim 14, further comprising an interface configured to receive data describing the graphical content displayed on the primary display.

16. The peripheral display system of claim 14, wherein rendering the complementary content based on the graphical content displayed on the primary display and the mismatch further comprises:
  responsive to detecting the mismatch, creating an optical flow that moves in a direction of the virtual motion included in the graphical content displayed on the primary display, and the complementary content comprises the optical flow for display on the peripheral display.

17. The peripheral display system of claim 14, wherein the peripheral display comprises fewer elements to be driven as compared to the primary display of the head mounted display device.

18. A method of controlling operation of a head mounted display device, comprising:
  receiving motion information that specifies actual motion of a user of the head mounted display device;
  detecting a mismatch between the actual motion of the user specified by the motion information and virtual motion included in graphical content displayed on a central portion of a display of the head mounted display device;

responsive to detecting the mismatch, creating an optical flow that moves in a direction of the virtual motion included in the graphical content; and causing the optical flow to be displayed on a periphery portion of the display of the head mounted display device.

19. The method of claim 18, further comprising:

causing the graphical content to be displayed on a primary display of the head mounted display device, the primary display provides a field of view; and causing the optical flow to be displayed on a peripheral display of the head mounted display device, the peripheral display being positioned relative to the primary display such that an overall field of view provided by the primary display and the peripheral display is extended compared to the field of view of the primary display.

20. The method of claim 18, further comprising:

causing the graphical content and the optical flow to be displayed on a common display of the head mounted display device.

\* \* \* \* \*